United States Patent [19]

Krause et al.

[11] Patent Number: 4,894,111
[45] Date of Patent: Jan. 16, 1990

[54] PLUG PART FOR RELEASABLE PLUG-TYPE CONNECTIONS OF EIGHT WAVEGUIDE

[75] Inventors: Dieter Krause; Josef Sedlmaier; Norbert Odemar, all of Munich, Fed. Rep. of Germany

[73] Assignee: Siemens Aktiengesellschaft, Berlin and Munich, Fed. Rep. of Germany

[21] Appl. No.: 856,433

[22] Filed: Apr. 22, 1986

[30] Foreign Application Priority Data

Mar. 25, 1983 [DE] Fed. Rep. of Germany ....... 3310973

[51] Int. Cl.⁴ ............................................. B32B 31/06
[52] U.S. Cl. ..................................... 156/294; 29/272; 29/464; 29/467; 65/29; 156/423; 269/43
[58] Field of Search ................... 156/294, 423; 29/702, 29/272, 464, 467; 350/96.20, 96.21, 96.22; 65/29; 269/43

[56] References Cited

U.S. PATENT DOCUMENTS

| | | | |
|---|---|---|---|
| 2,755,840 | 7/1956 | Bartley | 156/423 |
| 3,847,703 | 11/1974 | Kaiser | 156/294 |
| 4,185,883 | 1/1980 | Chown et al. | 350/96.20 |
| 4,226,652 | 10/1980 | Berg | 156/294 |
| 4,290,668 | 9/1981 | Ellis et al. | 350/96.20 |
| 4,330,171 | 5/1982 | Malsot et al. | 350/96.21 |
| 4,390,237 | 6/1983 | Marazzi | 350/96.20 |
| 4,424,174 | 1/1984 | Howarth | 350/96.21 |
| 4,509,820 | 4/1985 | Murata et al. | 350/96.21 |
| 4,524,561 | 6/1985 | Liekens et al. | 156/294 |
| 4,536,238 | 8/1985 | Dischert | 156/423 |
| 4,567,650 | 2/1986 | Balyasay et al. | 350/96.20 |
| 4,581,164 | 4/1986 | Klufas et al. | 29/464 |
| 4,594,763 | 6/1986 | Frazee et al. | 29/702 |

FOREIGN PATENT DOCUMENTS 2557472 6/1977 Fed. Rep. of Germany ... 350/96.20
8119993 9/1981 Fed. Rep. of Germany .

Primary Examiner—Merrell C. Cashion, Jr.
Attorney, Agent, or Firm—Hill, Van Santen, Steadman & Simpson

[57] ABSTRACT

A plug part for a releasable plug-type connection of light waveguides that can be manufactured with little outlay is provided which comprises a capillary having an acceptance opening for the light waveguide, a plug cylinder in which the capillary is disposed such that its acceptance opening is coaxially aligned relative to the outside circumference of the plug cylinder and a hardenable bonding agent which is introduced into the annular gap between the capillary and plug cylinder. The capillary is accepted between two centering tips for the precise adjustment in the plug cylinder. This adjustment ensues in a guide prism in which two cylindrical centering tip carriers with coaxially attached centering tips and the plug cylinder with the capillary loosely contained therein are placed, whereby the two centering tip carriers have the same outside diameter as the plug cylinder.

8 Claims, 3 Drawing Sheets

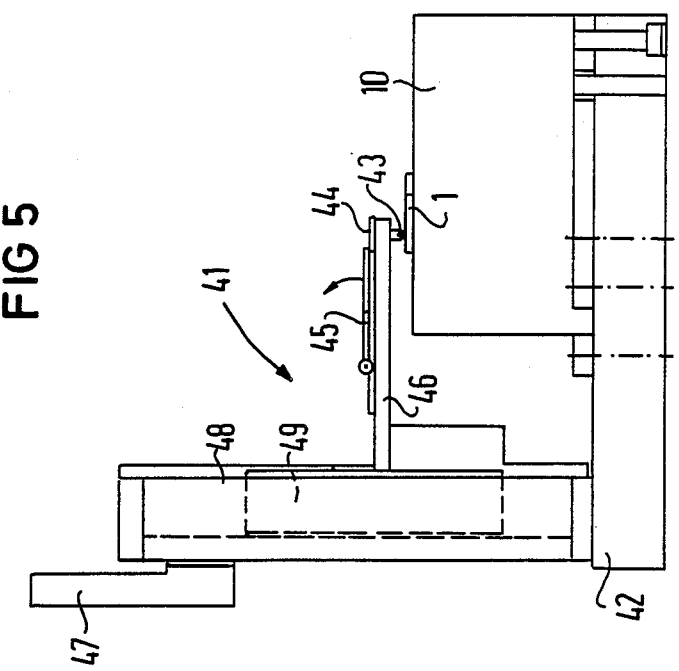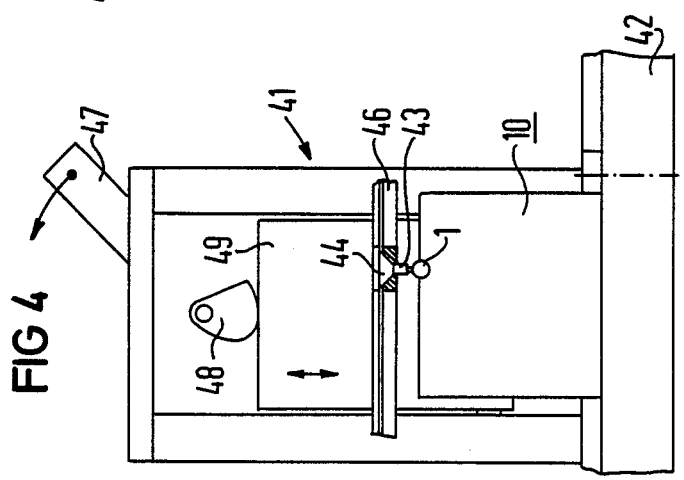

PLUG PART FOR RELEASABLE PLUG-TYPE CONNECTIONS OF EIGHT WAVEGUIDE

This is a division of application Ser. No. 588,151 filed Mar. 9, 1984, now abandoned.

BACKGROUND OF THE INVENTION

1. Field of the Invention

The invention relates to a plug part for releasable plug-type connections of light waveguides and also relates to a method of manufacturing such a plug part and to an apparatus for the execution of the manufacturing method.

2. Description of the Prior Art

In order to obtain a low coupling attenuation when using releasable plug-type connections of light waveguides with arbitrary plug pairings, the concentricity error between the acceptance opening for the light waveguide and the outer circumference of the corresponding plug cylinder must be lower than 5 $\mu$m, and, the diameter tolerances of the acceptance openings and of the outside diameter of the plug cylinder must amount to less than 2 $\mu$m.

A plug part for releasable plug-type connections of light waveguides is known from the German Utility Model No. 81 19 993 wherein the capillary acceptance opening for the end region of the light waveguide stripped of its jacket is introduced into a socket of material that can be easily machined. This socket is then pressed into the front end of a plug cylinder, the front end having an expanded diameter. When using plug parts joined in such manner, however, both the socket as well as the plug cylinder must be fabricated with extreme precision in order to meet the afore-mentioned conditions.

A plug part for releasable plug-type connections of light waveguides of the type described above is known from the EP-A1-0 025 013 wherein the acceptance opening of a capillary can be coaxially aligned relative to the outer circumference of the plug cylinder. In order to enable this coaxial alignment, the capillary is first glued into a small holding tube that is long enough to be accepted into a corresponding centering means. The acceptance opening of the capillary is then coaxially aligned relative to the outer circumference of the plug cylinder with the assistance of the centering means, whereupon a hardenable bonding agent is introduced into the annular gap between the plug cylinder and the small holding tube in order to fix this position. The production of this known plug part, however, requires considerable outlay in terms of work and adjustment.

SUMMARY OF THE INVENTION

An object of the invention is to create a plug part for releasable plug-type connections of light waveguides wherein the precision required for a low coupling attenuation can be achieved with noticeably reduced outlay relative to production methods.

The invention is based on the realization that the necessary coaxial alignment between the acceptance opening of the capillary and the outer circumference of the plug cylinder can also be obtained by means of a direct adjustment of the capillary inside the plug cylinder. By employing this direct adjustment, the small holding tube hitherto required for the coaxial alignment can be eliminated and the hardenable bonding agent can be introduced into an annular gap formed between the outer circumference of the capillary and the inside circumference of the plug cylinder. An extremely simple manufacturing process for the inventive plug part results upon elimination of the small holding tube and of the work step hitherto required for the connection of the capillary and holding tublet. Further, the plug cylinder can also be fabricated with a greater wall thickness, this enabling easier and more precise working of the plug cylinder. It should also be mentioned as a further advantage, that the connection between the inventive plug part and a light waveguide can be made at the place of employment of the two parts rather than prior to such time.

In a preferred development of the inventive plug part, the hardenable bonding agent can be introduced into the annular gap through an opening in the jacket of the plug cylinder. The hardenable bonding agent can than be introduced into the annular gap with low outlay, for example with the assistance of a funnel.

In a further preferred development of the inventive plug part, the acceptance opening of the capillary has a funnel-shaped expansion at its end lying opposite the coupling surface of the plug-type connection. The introduction of the light waveguide stripped of its cladding into the acceptance opening is thus considerably simplified by means of this funnel-shaped expansion.

An advantageous method for manufacturing the inventive plug part comprises the following steps:

(a) the capillary is loosely introduced into the plug cylinder, (b) the capillary is then engaged by two centering tips, (c) the acceptance opening of the capillary is coaxially aligned relative to the outside circumference of the plug cylinder with the assistance of the centering tips, and (d) the capillary is then fixed in the plug cylinder by curing the hardenable bonding agent introduced into the annular gap.

The problem of a precise adjustment of the capillary in the plug cylinder resulting from the elimination of the previously employed holding tublet and by the small dimensions of the capillary is thus resolved in an extremely simple fashion in that the capillary is held between two centering tips and is adjusted with the assistance of these centering tips. This method allows for the hardenable bonding agent to be introduced into the annular gap after the coaxial alignment of the capillary. The glueing event required for fixing the capillary in the plug cylinder and the adjusting process can thereby be carried out chronologically and spatially separated.

The present invention further includes an apparatus for the implementation of the method described above, this apparatus being characterized by the following features:

(a) two cylindrical centering tip carriers are accepted in a guide prism, (b) the two centering tip carriers exhibit the same outside diameter as the plug cylinder, (c) a coaxially aligned centering tip is applied to each centering tip carrier, (d) at least one of the centering tip carriers is displaceable in the longitudinal direction of the guide prism.

By using an apparatus designed in such manner, the plug cylinder together with the capillary loosely accepted therein can be placed into the guide prism between the centering tips. The capillary is then engaged by the centering tips by means of longitudinally displacing one centering tip carrier or both centering tip carriers, whereby the acceptance opening of the capillary is aligned coaxially relative to the outside circumference of the plug cylinder at the same time. This virtually automatic coaxial alignment results because the two centering tip carriers and the plug cylinder have the same outside diameter.

In a preferred embodiment of the apparatus described above, a pre-centering device displaceable in longitudinal direction of the guide prism is associated with one of the centering tip carriers disposed in the guide prism, whereby the pre-centering device has a centering cone engagable by the end face of the capillary and penetrable by the centering tip of the centering tip carrier. The capillary can then be initially engaged by a centering tip at its one end and by the centering cone of the pre-centering device at its other end. After such a pre-centering step occurs, the second centering tip can then advance through the centering cone unimpeded into the acceptance opening of the capillary. The employment of the pre-centering device is particularly advantageous when the acceptance opening of the capillary has a diameter that is equal to or smaller than the difference between the outside diameter and the inside diameter of the annular gap between the capillary and the plug cylinder.

In a further embodiment of the apparatus, the plug cylinder and at least one of the centering tip carriers can be braced in the guide prism by means of releasable clamp devices. After the coaxial alignment of the capillary, the bracing of the plug cylinder and centering tip carrier can then be maintained until the bonding agent introduced into the annular gap has cured.

An automatic actuation of the apparatus can be provided by having at least one centering tip carrier axially displaceable in the guide prism via a control means. It is also useful for the pre-centering device to be displaceable in the longitudinal direction of the guide prism via the control means.

In a further embodiment, it is provided that the guide prism and the two entering tip carriers are disposed in an adjustment receptacle that can be removed from the apparatus. The adjustment receptacle can then be removed from the apparatus after the adjustment procedure so that the glueing event required for fixing the capillary in the plug cylinder can be executed chronologically and spatially separated. When using a precentering device, the removal of the adjustment receptacle is accomplished by providing the centering cone of the apparatus with a slot in the longitudinal direction. The centering cone can then be lifted from its associated centering tip through said slot.

Exemplary embodiments of the invention shall be explained in greater detail with reference to the drawing.

BRIEF DESCRIPTION OF THE DRAWINGS

FIG. 4 is an end elevational view of a glueing device;

FIG. 5 is a side elevational view of the glueing device of FIG. 4.

DESCRIPTION OF THE PREFERRED EMBODIMENTS

Figure 1:
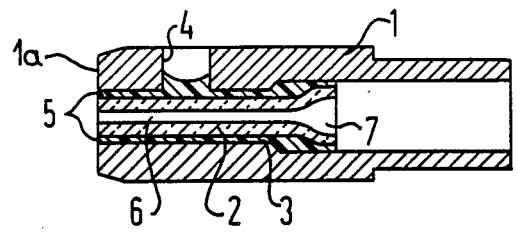
FIG. 1 is a side sectional view of a plug part for releasable plug-type connections of light waveguides.

FIG. 1 shows a longitudinal section through a plug part for releasable plug-type connections of light waveguides. The plug part consists of a plug body 1 which in a preferred embodiment is a cylinder having an end face 1a in which a capillary 2 is disposed, whereby the connection between the plug cylinder 1 and the capillary 2 is produced by means of a hardenable bonding agent 3. The hardenable bonding agent 3 is introduced through a radial opening 4 in the jacket of the plug cylinder 1 so that it is drawn by means of capillary action into an annular gap 5 formed between the outer circumference of the capillary 2 and the inside circumference of the plug cylinder 1. The capillary 2 has a high-precision acceptance opening 6 which has a funnel-shaped expansion or enlargement 7 at its back end.

During manufacture of the plug part illustrated in FIG. 1, plug cylinders 1 and capillaries 2 are separately fabricated and subsequently sorted in order to be able to achieve desired pairings. The capillary 2 of such an identified pairing is then inserted into the allocated plug cylinder 1 and adjusted there in a manner described below such that the acceptance opening 6 of the capillary 2 is coaxially aligned relative to the outside circumference of the plug cylinder 1. After this adjustment, the hardenable bonding agent 3 is introduced into the annular gap 5 in viscous form via the opening 4, so that a durable connection of plug cylinder 1 and capillary 2 is produced after said bonding agent has cured. Further assembly is then undertaken only at the place of employment of the plug, whereby the light waveguide stripped of its cladding in its end region is introduced into the acceptance opening 6 of the capillary 2 through the funnel-shaped expansion 7 and is glued fast in the acceptance opening 6. In order to complete a plug-type connection, two plug parts designed according to FIG. 1 abut at their end faces 1a, whereby the two plug cylinders 1 are secured in a shared centering sleeve or the like (not shown).

The plug cylinder 1 consists of an abrasion-proof material, for example hard metal, whereas a drawn glass capillary can be employed, for example, as the capillary 2. Suitable hardenable adhesives such as, for example, two package adhesive systems, can be employed as the hardenable bonding agent 3.

In order to convey an impression of the size of a plug part as shown in FIG. 1, a few typical dimensions of two exemplary embodiments are specified below:

Outside diameter of the plug cylinder 1 4.5 or 2.5 mm
Inside diameter of the plug cylinder 1 1.8 or 1.3 mm
Outside diameter of the capillary 2 1.4 or 0.9 mm
Diameter of the acceptance opening 6 0.13 or 0.13 mm
Diameter of the light waveguide 0.125 mm When using plug parts having such dimensions manufactured according to the present invention, the concentricity error between the acceptance opening 6 and the outside circumference of the plug cylinder 1 was always below 5 $\mu$m, whereas a coupling attenuation that was always less than 1 dB could be achieved given arbitrary plug pairings.

Figure 2:
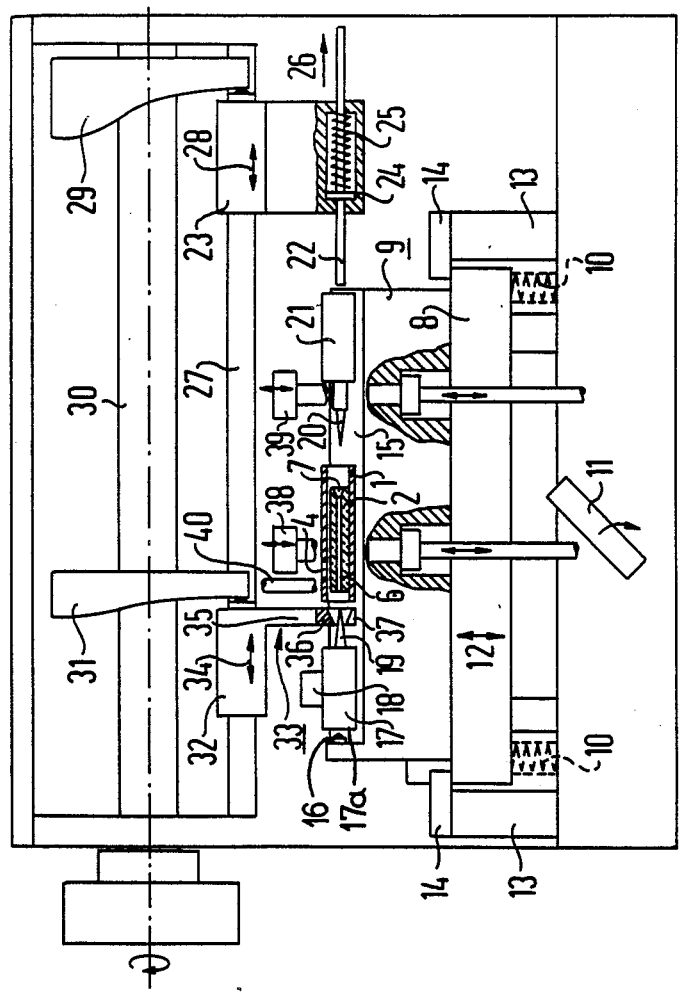
FIG. 2 is a plan view with portions cut away of an apparatus for producing the plug part shown in FIG. 1.

FIG. 2 shows an apparatus for producing the plug part shown in FIG. 1. This apparatus includes an elevating platform 8 on which an adjustment receptacle 9 is secured. The elevating platform 8, biased by springs 10, can be raised or lowered by means of actuating a lever 11, such movement being indicated by a double arrow 12. The upper position of the elevating platform 8 which corresponds to the adjustment position of the adjustment receptacle 9 is thereby defined by detents 14 attached to vertical columns 13.

The adjustment receptacle comprises a guide prism 15 which is limited at its left-hand end by a detent 16 in the position shown in FIG. 1. A first cylindrical centering means carrier 17 is carried in the guide prism 15, the carrier 17 resting against the detent 16 with its one end face 17a and being retained in this position by a clamping jaw 18. A first centering means 19 such as a pointed tip is secured to the other end face of the first centering tip carrier 17 aligned coaxially relative to its axis, a second centering means or tip 20 lying opposite said first centering tip 19 at a distance. The second centering tip is secured to a second cylindrical centering means carrier 21 and is coaxially aligned relative to the axis of the latter. The second centering tip carrier 21 is likewise carried in the guide prism 15 and in contrast to the rigidly disposed first centering tip carrier 17, is displaceable in longitudinal direction of the guide prism 15, whereby the displacement can be accomplished by use of a spring-cushioned press pin 22.

The press pin 22 is guided in a carriage 23 such that it can yield to the force of a spring 25 pressing against an enlargement 24 of the press pin 22, yielding in the direction of arrow 26. The carriage 23 carrying the press pin 22 is in turn carried on a guide rod 27 on which it can be moved in the directions of the double arrow 28 with the assistance of a ball bearing guide bushing. The movement of the carriage 23 is thereby controlled via a control drum 29 that is secured to a control shaft 30. A second control drum 31 is also disposed on the control shaft 30 and a carriage 32 of a pre-centering device 33 can be moved via the second control drum 31. The carriage 32 is disposed on the guide rod 27 on which it can be displaced in the directions of the double arrow 34 with the assistance of a ball bearing guide bushing The pre-centering device comprises a downwardly projecting arm 35 with a lower end provided with a centering cone 36 opening toward the right in the position shown in FIG. 2. The centering cone 36 is aligned such that it can be penetrated coaxially by the first centering tip 19 in the adjustment position of the adjustment receptacle 9. In its lower range, the centering cone 36 includes a longitudinally extending slot 37 through which the first centering tip 19 can pass when the elevating platform 8 is lowered.

The adjustment receptacle is also equipped with two releasable clamping devices 38 and 39, whereby the plug cylinder 1 can be braced in the guide prism 15 with the assistance of the clamping device 38 and whereby the second centering tip carrier 21 can be braced in the guide prism 15 with the assistance of the clamping device 39.

The apparatus shown in FIG. 2 functions in the following manner:

The adjustment receptacle 9 is clamped to the elevating platform 8 and is lifted into its adjustment position by means of actuating the lever 11. The pre-centering device 33 is moved into its insertion position by means of turning the central control shaft 30 and at the same time the clamping devices 38 and 39 of the adjustment receptacle 9 are opened. The plug cylinder 1 with the capillary 2 loosely positioned therein is then placed in the guide prism 15, namely in the region lying between the centering tips 19 and 20.

Figure 3:
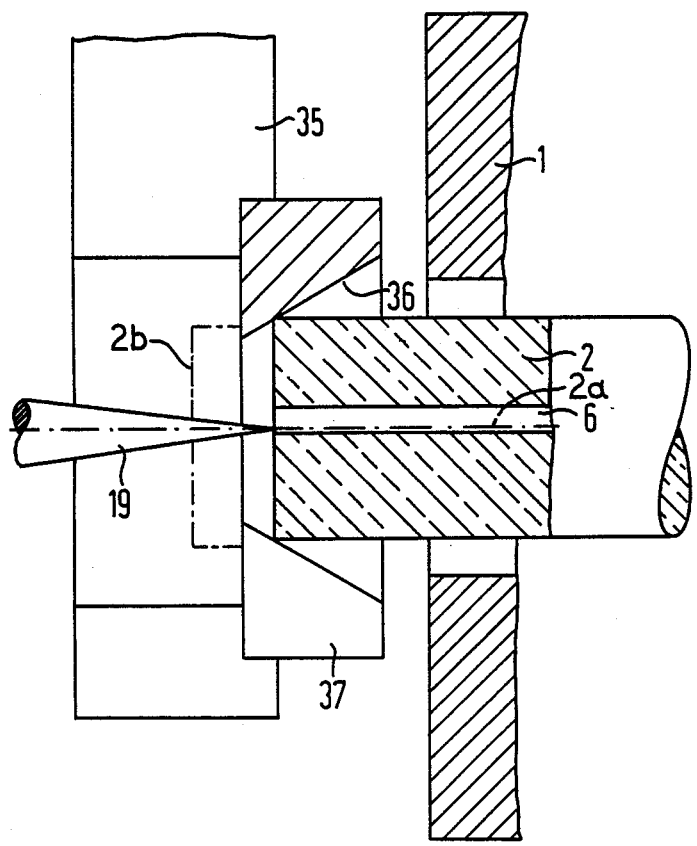
FIG. 3 is an enlarged plan view partially in cross-section of the pre-centering of the apparatus shown in FIG. 2.

After this insertion operation, the carriage 23 is displaced upon further rotation of the control shaft 30 such that the spring-cushioned press pin 22 moves the second centering tip carrier 21 toward the capillary 2. This movement causes the second centering tip 20 to enter into the funnel-shaped expansion 7 of the acceptance opening 6 and then pushes the capillary 2 into the centering cone 36 of the pre-centering device 33. It can be clearly seen from the enlarged illustration of FIG. 3 that the capillary 2, by means of its acceptance opening 6, can be engaged by the first centering tip 19 after this pre-centering operation, whereby the center line position later assumed by the capillary 2 is indicated by a dot-dash line 2a. The capillary 2 clamped between the press pin 22 and the centering cone 36 is then guided onto the first centering tip 19. Upon further rotation of the control shaft 30, only the pre-centering device 33 moves into its detent position whereupon the capillary 2 is deposited onto the first centering tip 19 as indicated by position 26 and, accordingly, rests only on the two centering tips 19 and 20. Subsequently, the press pin 22 is moved a little further, whereby the capillary 2 is precisely adjusted between the two centering tips 19 and 20.

The plug cylinder 1 is then pushed, for example manually, against the arm 35 of the pre-centering 33 and the opening 4 is adjusted with the assistance of a pin 40 that is schematically indicated in FIG. 2. As a result of continued rotation of the control shaft 30, the pre-centering device returns to its initial left-hand position. At the same time, the clamping devices 38 and 39 are actuated, whereby the plug cylinder 1 and the second centering tip carrier 21 are secured to the guide prism. The adjustment and clamping operation is then concluded. In the position thereby assumed, the acceptance opening 6 of the capillary 2 is coaxially aligned relative to the outside circumference of the plug cylinder 1. This coaxial alignment achieved with low outlay is in terms of time and costs is to be attributed to the fact that the two centering tip carriers 17 and 21 have the same diameter as the plug cylinder 1 and thus align the two coaxially aligned centering tips 19 and 20 and, thus, the acceptance opening 6 of the capillary 2 coaxially with respect to the outside circumference of the plug cylinder 1.

After the conclusion of the above-described adjustment and clamping operation, the elevating platform 8 is lowered and the loaded adjustment receptacle 9 is removed from the apparatus. Subsequently, the adjustment receptacle 9 is deposited in a glueing device 41 shown in FIGS. 4 and 5. The adjustment receptacle 9 is positioned on a table of the glueing device 41 such that a delivery pipe 43 of a glueing funnel 44 is aligned precisely above the opening 4 of the plug cylinder 1. The glueing funnel 44 is held by a pivotable plate 45 which is in turn applied to an extension arm 46 of the glueing device 41. Subsequently, a carriage 49 carrying the extension arm 46 is lowered by means of actuating a lever 47 and via a control cam 48 until the delivery pipe 43 of the glueing funnel 44 protrudes into the opening 4 of the plug cylinder 1. A suitable two package adhesive system is then mixed, for example, as the hardenable bonding agent 3 and filled into the glueing funnel 44 so that it can be introduced into the annular gap 5. Since the curing of the glue takes about 90 minutes, it is useful to load a number of adjustment receptacles 9 and to carry out the subsequent glueing thereof at the same time.

The work sequence required for the production of the plug parts shown in FIG. 1 could also be completely automated so that economical fabrication with high piece counts is attainable. The adjustment principle described with reference to FIGS. 2 and 3 can also be realized for other geometrical parts shapes in plug parts, since the shape of the centering tips and of the guide prism can be easily matched to the corresponding parts.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A method of manufacturing a plug part for releasable plug-type connections of light waveguides comprising:
   a capillary tube having a hollow interior with acceptance openings at each end for the acceptance of a light waveguide,
   a hollow plug body in which said capillary tube is inserted such that its hollow interior is coaxially aligned relative to the outside circumference of said plug body, and
   a hardenable bonding agent for securing said capillary tube in said plug body, wherein said hardenable bonding agent is introduced into an annular gap formed between the outside circumference of said capillary tube and the inside circumference of said plug body, comprising the following steps:
   (a) loosely introducing the capillary into the plug body,
   (b) engaging the capillary between two centering means,
   (c) coaxially aligning the acceptance opening of the capillary relative to the outside circumference of the plug body with the assistance of the centering means, and
   (d) fixing the capillary in the plug body by means of curing a hardenable bonding agent introduced into the annular gap.

2. A method as claimed in claim 1 wherein the hardenable bonding agent is introduced into the annular gap after the coaxial alignment of the capillary.

3. An apparatus for the implementation of a method of manufacturing a plug part for releasable plug-type connections of light waveguides comprising a capillary tube having a hollow interior with acceptance openings at each end for the acceptance of the light waveguides, a hollow plug body in which said capillary tube is inserted such that its hollow interior is coaxially aligned relative to the outside circumference of said plug body, and a hardenable bonding agent for securing said capillary tube in said plug body, wherein said hardenable bonding agent is introduced into an annular gap formed between the outside circumference of said capillary tube in the inside circumference of said plug body, comprising the steps of loosely introducing the capillary into the plug body, engaging the capillary between two centering means, coaxially aligning the acceptance opening of the capillary relative to the outside circumference of the plug body with the assistance of the centering means, and fixing the capillary of the plug body by means of curing a hardenable bonding agent introduced into the annular gap comprising the following features:
   two cylindrical centering tip carriers are carried in a guide prism,
   the two centering tip carriers have the same outside shape and size as the plug body,
   a coaxially aligned centering tip is attached to each centering tip carrier, and at least one of the centering tip carriers is displaceable in the longitudinal direction of the guide prism, wherein a pre-centering device displaceable in longitudinal direction of the guide prism is associated with one of the centering tip carriers disposed in said guide prism and wherein said pre-centering device comprises a centering cone engagable with the end face of the capillary and penetrable by the centering tip of said one centering tip carrier.

4. An apparatus for the implementation of a method of manufacturing a plug part for releasable plug-type connections of light waveguides comprising:
   a capillary tube having a hollow interior with light acceptance openings at each end for the acceptance of a light waveguide,
   a hollow plug body in which said capillary tube is inserted such that its hollow interior is coaxially aligned relative to the outside circumference of said plug body, and
   a hardenable bonding agent for securing said capillary tube in said plug body, wherein said hardenable bonding agent is introduced into an annular gap formed between the outside circumference of said capillary tube and the inside circumference of said plug body, comprising the following steps:
   (a) loosely introducing the capillary end of the plug body,
   (b) engaging the capillary between two centering means,
   (c) coaxially aligning the acceptance opening of the capillary relative to the outside circumference of the plug body with the assistance of the centering means, and
   (d) fixing the capillary and the plug body by means of curing a hardenable bonding agent introduced into the annular gap, comprising the following features:
   two cylindrical centering tip carriers are carried in a guide prism,
   the two centering tip carriers have the same outside shape and size as the plug body,
   a coaxially aligned centering tip is attached to each centering tip carrier, and
   at least one of the centering tip carriers is displaceable in the longitudinal direction of the guide prism, wherein the plug body and at least one of the centering tip carriers are braceable in the guide prism by means of releasable clamping devices.

5. An apparatus for the implementation of a method of manufacturing a plug part for releasable plug-type connections of light waveguides comprising:
   a capillary tube having a hollow interior with light acceptance openings at each end for the acceptance of a light waveguide,
   a hollow plug body in which said capillary tube is inserted such that its hollow interior is coaxially aligned relative to the outside circumference of said plug body, and
   a hardenable bonding agent for securing said capillary tube in said plug body, wherein said hardenable bonding agent is introduced into an annular gap formed between the outside circumference of said capillary tube and the inside circumference of said plug body, comprising the following steps:
(a) loosely introducing the capillary end of the plug body,
(b) engaging the capillary between two centering means,
(c) coaxially aligning the acceptance opening of the capillary relative to the outside circumference of the plug body with the assistance of the centering means, and
(d) fixing the capillary and the plug body by means of curing a hardenable bonding agent introduced into the annular gap, comprising the following features:
two cylindrical centering tip carriers are carrier in a guide prism,
the two centering tip carriers have the same outside shape and size as the plug body,
a coaxially aligned centering tip is attached to each centering tip carrier,
at least one of the centering tip carriers is displaceable in the longitudinal direction of the guide prism, and
at least one centering tip carrier is axially displaceable in the guide prism via a control device, wherein the pre-centering device is also displaceable in longitudinal direction of the guide prism via said control device.

6. An apparatus as claimed in claim 3 wherein the guide prism and the two centering tip carriers are disposed in an adjustment receptacle that is removable from the apparatus.

7. An apparatus as claimed in claim 6 wherein the centering cone of the pre-centering device is slotted in longitudinal direction.

8. A method of manufacturing a plug part comprising:
a capillary tube having a small outside diameter,
a hollow plug body having an inside diameter greater than the outside diameter of said capillary,
and a hardenable bonding agent for securing said capillary in said plug body comprising the steps:
loosely introducing said capillary tube into said plug body,
engaging said capillary tube between two axially spaced centering means,
coaxially aligning the interior passage of said capillary tube relative to the outside circumference of said plug body by use of said centering means, and
securing said capillary tube in said plug cylinder by means of curing a hardenable bonding agent introduced into an annular gap between said capillary tube and said plug body.

* * * * *